United States Patent
Hayakawa et al.

(10) Patent No.: US 6,328,144 B1
(45) Date of Patent: Dec. 11, 2001

(54) INVERTED TYPE OF VEHICULAR DAMPER WITH VEHICLE HEIGHT ADJUSTING FUNCTION

(75) Inventors: Yukio Hayakawa; Kiyoshi Nakahara, both of Tochigi-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/441,215

(22) Filed: Nov. 16, 1999

(30) Foreign Application Priority Data

| Nov. 18, 1998 | (JP) | ................................................ 10-328028 |
| Nov. 18, 1998 | (JP) | ................................................ 10-328029 |
| Oct. 13, 1999 | (JP) | ................................................ 11-291281 |

(51) Int. Cl.$^7$ ........................................................ F16F 9/34
(52) U.S. Cl. ........................ 188/299.1; 188/274; 188/276; 188/322.5
(58) Field of Search ............................. 188/299.1, 274, 188/276, 322.5; 267/118, 121, 64.11, 64.13, 64.15, 64.16, 64.23; 60/396

(56) References Cited

U.S. PATENT DOCUMENTS

| 1,350,414 | * | 8/1920 | Langdon ........................... 267/64.23 |
| 2,805,854 | * | 9/1957 | Gaebler ......................... 267/64.16 X |
| 3,067,841 | * | 12/1962 | Kendall ................................ 188/274 |
| 5,927,071 | * | 7/1999 | Asanuma et al. ...................... 60/396 |
| 6,170,621 | * | 1/2001 | Nakahara et al. ................... 188/274 |

FOREIGN PATENT DOCUMENTS

| 3418572 | * | 8/1985 | (DE) . |
| 3708192 | * | 10/1987 | (DE) . |

* cited by examiner

*Primary Examiner*—Douglas C. Butler
*Assistant Examiner*—Melanie Torres
(74) *Attorney, Agent, or Firm*—Armstrong, Westerman, Hattori, McLeland & Naughton, LLP

(57) ABSTRACT

On an outside of a damper main body of an inverted type of vehicular damper, a pressure casing of a cylindrical shape which is connected to a damper rod is provided in a manner movable up and down. A pressure chamber for containing therein a pressure medium which varies between a liquid phase and a gaseous phase is formed between the damper main body and the pressure casing. An electric heater to heat and evaporate the pressure medium inside the pressure chamber is provided. Electric charging to the electric heater is controlled by a vehicle height detection switch which is attached to the damper rod or the like.

5 Claims, 2 Drawing Sheets

INVERTED TYPE OF VEHICULAR DAMPER WITH VEHICLE HEIGHT ADJUSTING FUNCTION

BACKGROUND OF THE INVENTION

1. Field of the Invention

The present invention relates to an inverted type of vehicular damper (i.e., a damper for a vehicle) with a vehicle height adjusting function which is built into a suspension of a vehicle such as a motor vehicle.

2. Description of the Related Art

An inverted type of vehicular damper is known. This damper is made up of a damper main body, and a damper rod which is inserted into the damper main body from the bottom or lower side thereof so as to be movable up and down (i.e., in the axial direction of the damper). The damper main body is connected to a vehicle body, and the damper rod is connected to an unsprung member so that a damping force against the vibrations of the unsprung member can be obtained.

In case a vehicle height adjusting function is added to this kind of vehicular damper, a vehicle height adjusting cylinder is interposed between the vehicle body and the damper main body. A pressure fluid from a pressure source is supplied to the vehicle height adjusting cylinder. In order to maintain the vehicle height constant even if the load carried on the vehicle varies, the following arrangement is made. Namely, there is provided a vehicle height detection switch made up of a limit switch or the like which is switched on or switched off as a result of a swinging movement of a suspension arm. A signal from the vehicle height detection switch is inputted into a controller. The pressure source for the vehicle height adjusting cylinder and a solenoid valve which is interposed in a pressure fluid supply circuit are controlled by the controller.

In the above-described conventional vehicular damper, however, there are required the pressure source for the vehicle height adjusting cylinder, the solenoid valve, and the controller to control them. As a consequence, the vehicular damper becomes expensive. In addition, since a piping work is required for connection between the pressure source and the vehicle height adjusting cylinder, it takes much time to build the vehicular damper into the vehicle.

In view of the above-described disadvantages of the prior art, the present invention has an object of providing an inverted type of vehicular damper with a vehicle height adjusting function which is low in cost and superior in the ease with which the vehicular damper can be built into the vehicle.

SUMMARY OF THE INVENTION

In order to attain the above and other objects, the present invention is an inverted type of vehicular damper with vehicle height adjusting function comprising: a damper main body; a damper rod which is inserted from a lower side into the damper main body so as to be movable up and down; a pressure casing of a cylindrical shape which is connected to the damper rod and is disposed outside the damper main body so as to be movable up and down such that a pressure chamber for filling therein a pressure medium which varies between a liquid phase and a gaseous phase is formed between the damper main body and the pressure casing; an electric heater for heating and evaporating the pressure medium inside the pressure chamber; and a vehicle height detection switch for detecting a vehicle height. The vehicle height detection switch is used to control electric charging to the electric heater.

When the electric heater is charged with electricity, the pressure medium is heated and evaporated. The pressure casing, i.e., the damper rod, is thus pushed down relative to the damper main body by the vapor pressure of the pressure medium, with the result that the vehicle height increases. In this manner, the pressure casing and the electric heater constitute a thermal-pressure conversion type of pressure source. By integrally building this pressure source into the damper, the ease with which the damper is assembled into the vehicle can be improved.

In addition, by only charging the electric heater with electricity when the vehicle height has become smaller than a detected set height of the vehicle height detection switch, the vehicle height can be maintained at a constant height irrespective of the load which is carried on the vehicle. As a result, no special controller is required any more. In conjunction with the fact that a separate pressure source is not required, the above arrangement can bring about a large reduction in cost.

There is a possibility that the charging of the electric heater with electricity for the left side damper and for the right side damper is separately controlled by a vehicle height detection switch respectively provided on the left side and on the right side. In this arrangement, however, the electric heater of the left side damper or of the right side damper may be wastefully charged with electricity due to a rolling movement of the vehicle while running. In addition, the electric heater of the left side damper or of the right side damper may also be charged with electricity when one of the left wheel or the right wheel of the vehicle, while parking, is in a recess or runs on to a projection such as a curbstone. In such a case, if the vapor pressure of the pressure medium in the pressure casing increases as a result of electric charging to the electric heater, the vapor pressure will not readily lower even if the electric charging to the electric heater is stopped. As a consequence, the driver of the vehicle will have to be forced to drive the vehicle, for some time after starting, in an inclined state in which the vehicle height on one side is higher than that on the other side.

In order to avoid such a disadvantage, it is preferable to provide the vehicle height detection switch on each of left and right sides of the vehicle. The electric heater of each of the left and right dampers is charged with electricity when both left and right vehicle heights are below a detection set height of the vehicle height detection switch.

Further, preferably, a plurality of vehicle height detection switches having different detection set heights are provided, and the vehicular damper further comprises a switch selecting means, wherein charging of electricity to the electric heaters is controlled by a vehicle height detection switch selected by the switch selecting means out of the plurality of vehicle detection switches. In this arrangement, the vehicle height can advantageously be switched by the operation of the switch selecting means.

As the vehicle height detection switch, a limit switch which is switched on and switched off by the swinging of the suspension arm may also be used. In this arrangement, however, a bracket for mounting the limit switch as well as a protector for the limit switch are required, with the result that the number of parts increase and the cost becomes high. By the way, in an inverted type of vehicular damper, there is the following type of damper. Namely, the damper main body contains therein: a lower first spring receiving member disposed on the damper main body; an upper second spring receiving member disposed on the damper rod; a rebound spring interposed between the first spring receiving member and the second spring receiving member, a lower end of the rebound spring being constantly seated on the first spring receiving member; a third spring receiving member which is movable relative to the damper main body and the damper rod and is constantly seated on an upper end of the rebound spring, wherein, when the vehicular damper has extended beyond a predetermined value, the second spring receiving member comes into contact with the third spring receiving member to thereby compress the rebound spring. In such a damper, preferably, the third spring receiving member is at least partially magnetized and a magnetic induction switch is disposed at that portion of the second spring receiving member which comes into contact with the magnetized portion of the third spring receiving member. The magnetic induction switch constitutes the vehicle height detection switch. In this arrangement, since the magnetic induction switch is mounted on the second spring receiving member and since the switch is protected from the outside because it is disposed inside the damper main body, it is not necessary to provide a special mounting bracket as well as a protector. This contributes to a cost reduction.

Even if the electric charging to the electric heater is controlled by the vehicle height detection switch as described above, the following phenomenon sometimes occurs. Namely, when the load carried on the vehicle has been unloaded or the number of passengers has decreased, as well as when self-heat generation has occurred to the damper due to the damping operation, the vehicle height sometimes overshoots relative to the set vehicle height. In order to avoid this kind of phenomenon, it is preferable to provide cooling fins disposed on an outer periphery of an upper portion of the pressure casing; an outer casing of a cylindrical shape which covers the cooling fins, the outer casing being connected to the damper main body and so arranged that, as a result of a downward movement of the damper rod relative to the damper main body, the cooling fins are exposed below the outer casing. In this arrangement, due to the cooling effect by the wind which flows along the surfaces of the cooling fins exposed below the outer casing, the amount of heat dissipation from the pressure chamber increases and the vapor pressure rapidly decreases as a result of the increase in the vehicle height. Consequently, the overshooting of the vehicle height can be restricted.

If mud or the like adheres to the cooling fins, the heat dissipation from the cooling fins is hindered. In order to prevent such a disadvantage, it is preferable to arrange the cooling fins to be elongated in the vertical direction, and to attach a brush to a lower end of the outer casing so as to come into sliding contact with the cooling fins. In this arrangement, the mud adhered to the cooling fins is scraped off by the brush to thereby advantageously maintain the good heat dissipating characteristics of the cooling fins.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 1A and 1B show an embodiment of the present invention in which FIG. 1A is a side view, partly shown in section, of a damper of the present invention, and FIG. 1B is a circuit diagram of a control circuit for an electric heater for use therein;

DETAILED DESCRIPTION OF PREFERRED EMBODIMENTS

Explanation will now be made about preferred embodiments of the damper according to the present invention.

Figure 1A:
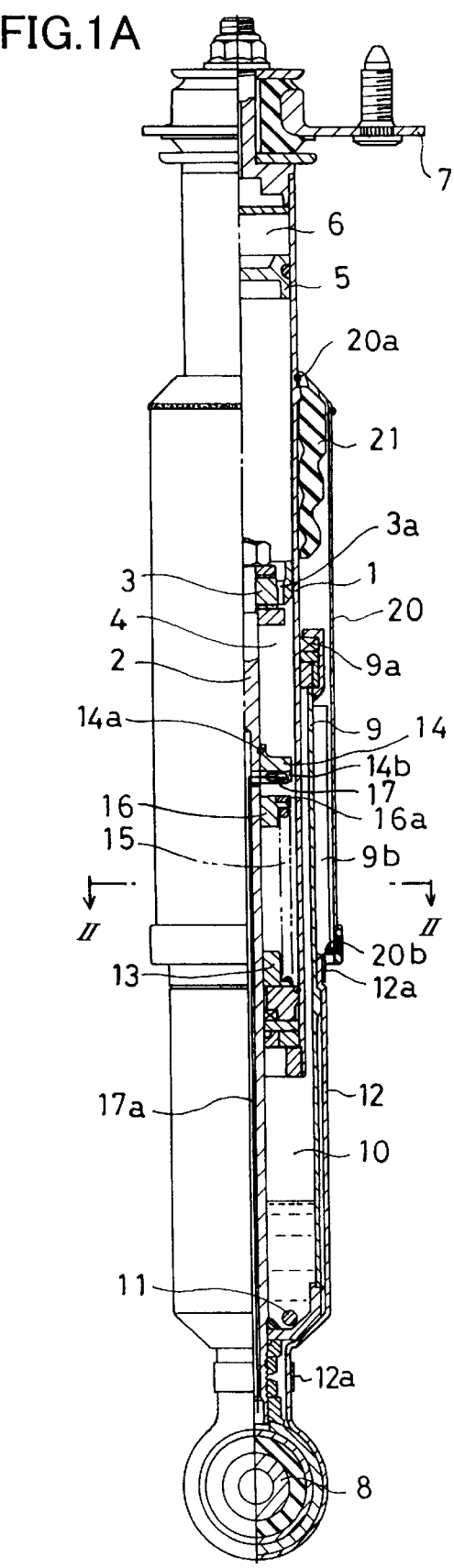

In FIG. 1A, reference numeral 1 denotes a damper main body of a cylindrical shape. A damper rod 2 is inserted into the damper main body 1 from the bottom or lower side thereof so as to be movable up and down (i.e., in the axial direction of the damper). A damper piston 3 having an orifice 3a penetrating therethrough is attached to an upper end of the damper rod 2. Inside the damper main body 1, there are defined an oil chamber 4 into which the damper piston 3 is inserted, and a gas chamber 6 which is partitioned by a free piston 5 relative to the oil chamber 4 so as to lie above the free piston 5. An inverted type of single-tube hydraulic damper is thereby constituted. The damper main body 1 is connected to the vehicle body via a bracket 7 which is attached to an upper end of the damper main body 1, and the damper rod 2 is connected to an unsprung member via a bush 8 which is attached to a lower end of the damper rod 2. It is thus so arranged that a damping force against the vertical vibrations of the unsprung member can be obtained.

Outside the damper main body 1, there is provided a pressure casing 9 of a cylindrical shape so as to be movable up and down. The lower end of the pressure casing 9 is hermetically connected to the damper rod 2. A sealing member 9a which seals the clearance between the damper main body 1 and the pressure casing 9 is provided on an upper end of the pressure casing 9. A hermetically sealed pressure chamber 10 is thereby defined between the damper main body 1 and the pressure casing 9. This pressure chamber 10 is filled with a pressure medium of low boiling point such as Freon 134a, R152a or the like after mixing it with a lubrication oil. The pressure medium varies between a liquid phase and a gaseous phase. A bar-shape electric heater 11, which serves as a heating source, is disposed at the bottom of the pressure chamber 10. In this arrangement, when the electric heater 11 is charged with electricity, the liquid phase pressure medium which stays at the bottom of the pressure chamber 10 is heated and evaporated. The vapor pressure in the pressure chamber 10 consequently increases, and the pressure casing 9, i.e., the damper rod 2, is pushed down by the vapor pressure, whereby the vehicle height increases.

A thermal insulating cover 12 which is made of a synthetic resin is provided so as to cover an outer peripheral surface in the lower portion of the pressure casing 9 over an outer periphery of the bush 8. The heat of the electric heater 11 is thus prevented from dissipating to the outside. The heating efficiency of the electric heater 11 for heating the pressure medium is thus improved. The thermal insulating cover 12 is made up of two longitudinally divided halves (i.e., halves divided along the axial direction of the damper), which are tied together by a pair of upper and lower bands 12a, 12a.

The damper main body 1 has therein a first spring receiving member 13 which is provided above an end piece 1a at the lower end of the damper main body 1, and a second spring receiving member 14 which is fixed to the damper rod 2 by a snap ring 14a. Between these first spring receiving member 13 and the second spring receiving member 14, there is interposed a rebound spring 15. The lower end of this rebound spring 15 is constantly seated on the first spring receiving member 13. There is further provided a third spring receiving member 16 which is constantly seated on the upper end of the rebound spring 15 and which is movable relative to the damper main body 1 and the damper rod 2. When the extension of the damper has exceeded a predetermined value as a result of the downward movement of the damper rod 2 relative to the damper main body 1, the second spring receiving member 14 first comes into contact with the third spring receiving member 16 and thereafter compresses the rebound spring 15. The extension of the damper beyond the predetermined value can thus be elastically restricted.

Part of an upper surface of the third spring receiving member 16 is magnetized by a magnet 16a which is embedded therein. A recessed groove 14b is formed in that lower surface of the second spring receiving member 14 which lies opposite to the magnet 16a. A lead switch 17 is fixed with an adhesive agent or the like to the inside of the recessed groove 14b. When the second spring receiving member 14 comes into contact with the third spring receiving member 16, the lead switch 17 is switched on. Let the vehicle height when the second spring receiving member 14 comes into contact with the third spring receiving member 16 be called a detection set height (i.e., a height which is set for detecting purpose). Then, the lead switch 17 is switched on when the vehicle height is above the detection set height and is switched off when the vehicle height is below the detection set height. The lead switch 17 thus functions as a vehicle height detection switch.

Figure 1B:
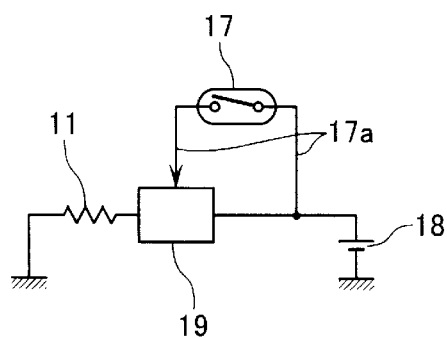

In order to enable to maintain the vehicle height to a set height even when the load carried on the vehicle varies, an arrangement as shown in FIG. 1B is employed. Namely, in a circuit which connects the electric heater 11 to an electric power source 18, a switching element 19 such as an field-effect transistor (FET) is interposed. When the lead switch 17 is switched off, this switching element 19 is switched on. When the lead switch 17 is switched on, this switching element 19 is switched off. In this manner, when the vehicle height is below a detection set height, the electric heater 11 is charged with electricity. When the vehicle height is above the detection set height, the charging of electricity to the electric heater 11 is stopped. A lead wire 17a which is connected to the lead switch 17 is led outward from the lower end of the damper rod 2 through an axial hole which is formed in the damper rod 2 and is further connected to the electric power source 18 and the switching element 19.

Figure 2:
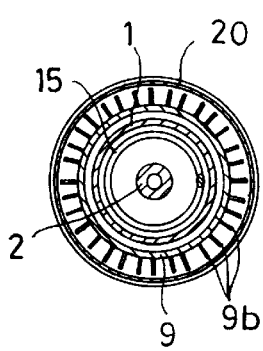
FIG. 2 is a sectional view taken along the line II—II in FIG. 1A.

When the load on the vehicle has been unloaded or when the number of passengers on the vehicle has decreased, or when a self heating has occurred to the damper due to the damping operation, there are occasions where the vehicle height largely overshoots the detection set height. To cope with this kind of occurrence, in the present embodiment, the following arrangement has been made. Namely, as shown in FIG. 2, an outer periphery of an upper portion of the pressure casing 9 is provided with a plurality of cooling fins 9b which are elongated in the vertical direction (i.e., in the axial direction of the damper) at a distance from one another as seen in the circumferential direction. In addition, a cylindrical outer casing 20 which covers the cooling fins 9b is connected at an upper end thereof to the damper main body 1 by means of a snap ring 20a. As a result of the downward movement of the damper rod 2 relative to the damper main body 1, i.e., as a result of an increase in the vehicle height, the cooling fins 9b are exposed to the outside below the outer casing 20. Once the cooling fins 9b are exposed to the outside, the amount of heat dissipation from the pressure chamber 10 increases due to the cooling effect by the running wind which flows along the surfaces of the cooling fins 9b. The vapor pressure thus rapidly lowers and, as a consequence, the overshooting of the vehicle height can be restricted.

In addition, the lower end of the outer casing 20 is provided with brushes 20b which come into sliding contact with the cooling fins 9b. Mud or the like which is adhered to the cooling fins 9b is scraped off by the brush 20b. The deterioration in heat dissipating characteristics of the cooling fins 9b due to the adhered mud or the like can thus be prevented. It is also possible to arrange the cooling fins 9b in the shape of rings, each elongating in the circumferential direction of the pressure casing 10. However, when the ease with which the cleaning of the cooling fins 9b by the brush 20b is considered, it is preferable to arrange the cooling fins 9b in the shape to extend in the longitudinal direction as illustrated in this embodiment.

Further, in this embodiment, a bump stop rubber 21 which extends from the upper end of the outer casing 20 downward is vertically provided between the damper main body 1 and the outer casing 20. When the compression of the damper has exceeded a predetermined value, the upper end of the pressure casing 10 comes into contact with the bump stop rubber 21. It is thus so arranged that compression of the damper beyond the predetermined value can be elastically restricted.

Figure 3:
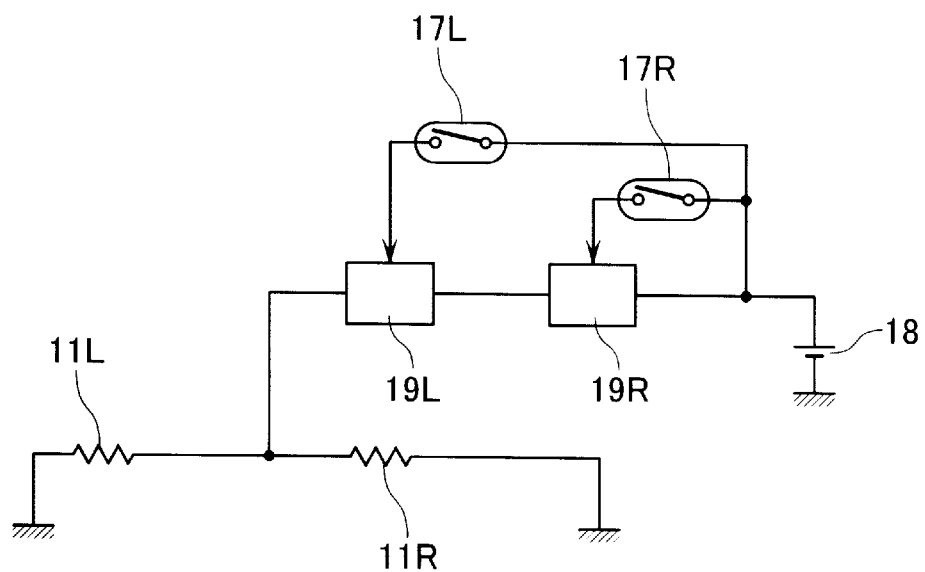
FIG. 3 is a circuit diagram of a second embodiment of the control circuit for the electric heater.

Furthermore, in the above-described first embodiment, the electric charging to the electric heater 11 in each damper is independently controlled by the lead switch 17 which is provided in each of the dampers. In the second embodiment which is illustrated in FIG. 3, the following arrangement is employed. Namely, a switching element 19L to be switched on when the lead switch 17L provided in the damper for the left wheel of the vehicle is switched off, and a switching element 19R to be switched on when the lead switch 17R provided in the damper for the right wheel of the vehicle is switched off, are connected in series. The electric heater 11L for the left wheel damper and the electric heater 11R for the right wheel damper are connected to the electric power source 18 via both the switching elements 19L, 19R. When both the lead switches 17L, 17R are switched off, i.e., when the right and left vehicle heights of the vehicle are both below the detection set height, both the electric heaters 11L, 11R of the dampers for the left wheel and the right wheel are charged with electricity. According to this arrangement, even if the vehicle height of either the left side or the right side has fallen below the detection set height due to the rolling movement of the vehicle while running, or even if the lead switch in one of the left side damper or the right side damper is switched off when one of the left side wheel and the right side wheel has fallen into a recess or rolled over a projection such as a curbstone, the electric charging to the electric heaters 11L, 11R does not take place.

In the above-described first embodiment, the vehicle height detection switch is constituted by the lead switch 17 which is attached to the second spring receiving member 14 to be provided inside the damper. However, the vehicle height detection switch may also be constituted by a magnetic induction switch such as a Hall element or the like, other than the lead switch, which is provided on the second spring receiving member 14.

It is also possible to constitute the vehicle height detection switch by a limit switch which is switched on or switched off by the swinging movement of the suspension arm. As the vehicle height detection switch, there may be used one which is switched on when the vehicle height is below the detection set height.

Figure 4:
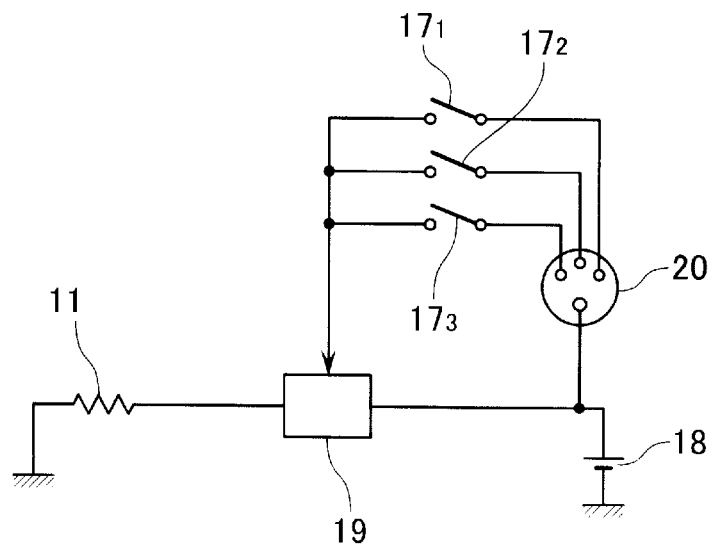
FIG. 4 is a circuit diagram of a third embodiment of the control circuit for the electric heater.

In the third embodiment illustrated in FIG. 4, a plurality of, e.g., three, vehicle height detection switches $17_1, 17_2, 17_3$ having different detection set heights and selection switch 20, which serves as a switch selecting means, are provided. Arbitrary one of these vehicle height detection switches $17_1, 17_2, 17_3$ is selected by the selection switch 20 as a switch to control the switching element 19 which connects the electric heater 11 of the damper to the electric source 18. According to this arrangement, the electric charging to the electric heater 11 is controlled such that the vehicle height is maintained at the detection set height selected by the selection switch 20. Therefore, it becomes possible to change the vehicle height by the operation of the selection switch 20.

In the above-described embodiments, the present invention was applied to the hydraulic damper. The present invention can also be applied to dampers other than hydraulic dampers, e.g., to friction dampers or the like.

As can be seen from the above explanations, according to the present invention, the pressure source for vehicle height adjustment can be built into the damper. The ease with which the damper can be assembled into the vehicle can be improved, and separate pressure source and special controller become unnecessary. The cost of the damper can thus be reduced.

It is readily apparent that the above-described vehicular damper with vehicle height adjusting function meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An inverted type of vehicular damper with vehicle height adjusting function comprising:

a damper main body;

a damper rod which is inserted from a lower side into said damper main body so as to be movable up and down;

a pressure casing having a cylindrical shape which is connected to said damper rod and is disposed outside said damper main body so as to be movable up and down such that a pressure chamber for filling therein a pressure medium which varies between a liquid phase and a gaseous phase is formed between said damper main body and said pressure casing;

an electric heater for heating and evaporating the pressure medium inside said pressure chamber; and a vehicle height detection switch for detecting a vehicle height, said vehicle height detection switch being used to control electric charging to said electric heater, wherein said vehicle height detection switch is adapted to be provided on each of left and right sides of a vehicle, and wherein said electric heater for each of left and right side dampers is charged with electricity when both left and right vehicle heights are below a detection set height of said vehicle height detection switch.

2. An inverted type of vehicular damper with vehicle height adjusting function comprising:

a damper main body;

a damper rod which is inserted from a lower side into said damper main body so as to be movable up and down;

a pressure casing having a cylindrical shape which is connected to said damper rod and is disposed outside said damper main body so as to be movable up and down such that a pressure chamber for filling therein a pressure medium which varies between a liquid phase and a gaseous phase is formed between said damper main body and said pressure casing;

an electric heater for heating and evaporating the pressure medium inside said pressure chamber; and a vehicle height detection switch for detecting a vehicle height, said vehicle height detection switch being used to control electric charging to said electric heater, wherein a plurality of vehicle height detection switches having different detection set heights are provided, said vehicular damper further comprising a switch selecting means, wherein charging of electricity to said electric heater is controlled by a vehicle height detection switch selected by said switch selecting means out of the plurality of vehicle height detection switches.

3. An inverted type of vehicular damper with vehicle height adjusting function comprising:

a damper main body;

a damper rod which is inserted from a lower side into said damper main body so as to be movable up and down;

a pressure casing having a cylindrical shape which is connected to said damper rod and is disposed outside said damper main body so as to be movable up and down such that a pressure chamber for filling therein a pressure medium which varies between a liquid phase and a gaseous phase is formed between said damper main body and said pressure casing;

an electric heater for heating and evaporating the pressure medium inside said pressure chamber; and a vehicle height detection switch for detecting a vehicle height, said vehicle height detection switch being used to control electric charging to said electric heater, wherein said damper main body contains therein:

a lower first spring receiving member disposed on said damper main body;

an upper second spring receiving member disposed on said damper rod;

a rebound spring interposed between said first spring receiving member and said second spring receiving member, a lower end of said rebound spring being constantly seated on said first spring receiving member;

a third spring receiving member which is movable relative to said damper main body and said damper rod and is constantly seated on an upper end of said rebound spring, wherein, when said vehicular damper has extended beyond a predetermined value, said second spring receiving member comes into contact with said third spring receiving member to thereby compress said rebound spring, said third spring receiving member being at least partially magnetized; and a magnetic induction switch disposed at that portion of said second spring receiving member which comes into contact with the magnetized portion of said third spring receiving member, said magnetic induction switch constituting said vehicle height detection switch.

4. An inverted type of vehicular damper with vehicle height adjusting function comprising:

a damper main body;

a damper rod which is inserted from a lower side into said damper main body so as to be movable up and down;

a pressure casing having a cylindrical shape which is connected to said damper rod and is disposed outside said damper main body so as to be movable up and down such that a pressure chamber for filling therein a pressure medium which varies between a liquid phase and a gaseous phase is formed between said damper main body and said pressure casing;

an electric heater for heating and evaporating the pressure medium inside said pressure chamber; and a vehicle height detection switch for detecting a vehicle height, said vehicle height detection switch being used to control electric charging to said electric heater, further comprising:

cooling fins disposed on an outer periphery of an upper portion of said pressure casing;

an outer casing of a cylindrical shape which covers said cooling fins, said outer casing being connected to said damper main body and so arranged that, as a result of a downward movement of said damper rod relative to said damper main body, said cooling fins are exposed below said outer casing.

5. An inverted type of vehicular damper according to claim 4, wherein said cooling fins are elongated in a vertical direction, further comprising:

a brush attached to a lower end of said outer casing so as to come into sliding contact with said cooling fins.

* * * * *